(12) United States Patent
Yamamoto (10) Patent No.: US 11,600,832 B2
(45) Date of Patent: Mar. 7, 2023

(54) FUEL CELL AND MANUFACTURING METHOD THEREOF

(71) Applicant: TOYOTA JIDOSHA KABUSHIKI KAISHA, Toyota (JP)

(72) Inventor: Atsushi Yamamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/456,530

(22) Filed: Nov. 24, 2021

(65) Prior Publication Data

US 2022/0209258 A1    Jun. 30, 2022

(30) Foreign Application Priority Data

Dec. 25, 2020    (JP) .............................. JP2020-216974

(51) Int. Cl.
*H01M 8/0273* (2016.01)
*H01M 4/88* (2006.01)
*H01M 8/1004* (2016.01)

(52) U.S. Cl.
CPC ....... *H01M 8/0273* (2013.01); *H01M 4/8807* (2013.01); *H01M 4/8896* (2013.01); *H01M 8/1004* (2013.01)

(58) Field of Classification Search
None
See application file for complete search history.

(56) References Cited

U.S. PATENT DOCUMENTS

2016/0104909 A1* 4/2016 Kawasumi .......... H01M 8/0297
429/535

FOREIGN PATENT DOCUMENTS

JP    2020140854 A    9/2020

* cited by examiner

*Primary Examiner* — Haroon S. Sheikh
(74) *Attorney, Agent, or Firm* — Hunton Andrews Kurth LLP (57) ABSTRACT

A support frame is placed on a second surface of an electrolyte membrane such that a second catalyst layer and a second gas diffusion layer are placed inside an opening of the support frame. When a fuel cell is viewed from a direction perpendicular to the electrolyte membrane, a first region and a second region are present, the first region being a region where the second gas diffusion layer is present, the second region being a region between an outer peripheral edge part of the second gas diffusion layer and an inner peripheral edge part of the opening of the support frame. A bonding power between a first catalyst layer and a first gas diffusion layer in the first region is smaller than a bonding power between the first catalyst layer and the first gas diffusion layer in the second region.

12 Claims, 11 Drawing Sheets

FUEL CELL AND MANUFACTURING METHOD THEREOF

CROSS-REFERENCE TO RELATED APPLICATION

This application claims priority to Japanese Patent Application No. 2020-216974 filed on Dec. 25, 2020, incorporated herein by reference in its entirety.

BACKGROUND

1. Technical Field

The technology described in the present specification relates to a fuel cell and a manufacturing method thereof.

2. Description of Related Art

A fuel cell described in Japanese Unexamined Patent Application Publication No. 2020-140854 (JP 2020-140854 A) is configured such that an anode-side catalytic layer and an anode-side gas diffusion layer are sequentially laminated on an anode side of an electrolyte membrane. Further, a cathode-side catalytic layer and a cathode-side gas diffusion layer are sequentially laminated on a cathode side of the electrolyte membrane.

SUMMARY

Since an electrolyte membrane expands and contracts due to temperature changes, generated water, or the like at the time when the fuel cell operates, stress concentration might cause a defect in the anode-side catalytic layer and the cathode-side catalytic layer.

A fuel cell described in the present specification includes an electrolyte membrane, first and second catalyst layers, first and second gas diffusion layers, and a support frame. The first catalyst layer is placed on a first surface of the electrolyte membrane. The first gas diffusion layer is placed on the first catalyst layer. The second catalyst layer smaller than the electrolyte membrane is placed on a second surface of the electrolyte membrane such that the second catalyst layer is placed inwardly from an outer periphery of the electrolyte membrane. The second gas diffusion layer smaller than the electrolyte membrane is placed on the second catalyst layer such that the second gas diffusion layer is placed inwardly from the outer periphery of the electrolyte membrane. The support frame includes an opening larger than the second catalyst layer and the second gas diffusion layer. The support frame is placed on the second surface of the electrolyte membrane such that the second catalyst layer and the second gas diffusion layer are placed inside the opening. When the fuel cell is viewed from a direction perpendicular to the electrolyte membrane, a first region and a second region are present, the first region being a region where the second gas diffusion layer is present, the second region being a region between an outer peripheral edge part of the second gas diffusion layer and an inner peripheral edge part of the opening of the support frame. A bonding power between the first catalyst layer and the first gas diffusion layer in the first region is smaller than a bonding power between the first catalyst layer and the first gas diffusion layer in the second region.

In the first region where the second gas diffusion layer is present, the dimension of the electrolyte membrane changes in accordance with a change of an amount of generated water due to power generation. In a case where the bonding power between the first catalyst layer and the first gas diffusion layer in the first region is made small, it is possible to restrain an internal stress to be caused by the first catalyst layer being pressed against the first gas diffusion layer at the time when the dimension of the electrolyte membrane changes. This makes it possible to prevent such a situation that defects occur in the first catalyst layer due to stress concentration. Further, the second gas diffusion layer has a function to support the electrolyte membrane when a force moving to the second surface side is applied to the electrolyte membrane. However, in the second region where the second gas diffusion layer is not present, the electrolyte membrane may not be supported, so that the electrolyte membrane may deform and split. When the bonding power between the first catalyst layer and the first gas diffusion layer in the second region is made large, it is possible to restrain deformation of the electrolyte membrane toward the second surface side. This makes it possible to improve durability of the electrolyte membrane.

A bonding power between the electrolyte membrane and the first catalyst layer in the first region may be smaller than a bonding power between the electrolyte membrane and the first catalyst layer in the second region. In a case where a defect occurs in the first catalyst layer, the electrolyte membrane can be separated from a contact boundary surface between the electrolyte membrane and the first catalyst layer near the defect. This makes it possible to restrain a stress from concentrating on the electrolyte membrane.

A bonding power between the second catalyst layer and the second gas diffusion layer in the first region may be smaller than the bonding power between the first catalyst layer and the first gas diffusion layer in the second region. This makes it possible to restrain an internal stress to be caused by the second catalyst layer being pressed against the second gas diffusion layer at the time when the dimension of the electrolyte membrane changes. This makes it possible to prevent such a situation that defects occur in the second catalyst layer.

A bonding power between the electrolyte membrane and the second catalyst layer in the first region may be smaller than a bonding power between the electrolyte membrane and the first catalyst layer in the second region. In a case where a defect occurs in the second catalyst layer, the electrolyte membrane can be separated from a contact boundary surface between the electrolyte membrane and the second catalyst layer near the defect. This makes it possible to restrain a stress from concentrating on the electrolyte membrane.

Respective outer peripheral edges of the electrolyte membrane, the first catalyst layer, and the first gas diffusion layer may overlap each other.

The second catalyst layer may be smaller than the second gas diffusion layer. The second catalyst layer may be placed inwardly from an outer periphery of the second gas diffusion layer.

The fuel cell may further include an adhesive layer placed on the second surface of the electrolyte membrane. When the adhesive layer is viewed from the direction perpendicular to the electrolyte membrane, the adhesive layer may be placed in the second region and a region where the support frame is present. Due to the adhesive layer, it is possible to fix the support frame to the outer periphery of the electrolyte membrane.

The technology described in the present specification is embodied in a manufacturing method for manufacturing a fuel cell. The fuel cell includes an electrolyte membrane, first and second catalyst layers, first and second gas diffusion layers, and a support frame. The first catalyst layer is placed on a first surface of the electrolyte membrane. The first gas diffusion layer is placed on the first catalyst layer. The second catalyst layer smaller than the electrolyte membrane is placed on a second surface of the electrolyte membrane such that the second catalyst layer is placed inwardly from an outer periphery of the electrolyte membrane. The second gas diffusion layer smaller than the electrolyte membrane is placed on the second catalyst layer such that the second gas diffusion layer is placed inwardly from the outer periphery of the electrolyte membrane. The support frame includes an opening larger than the second catalyst layer and the second gas diffusion layer. The support frame is placed on the second surface of the electrolyte membrane such that the second catalyst layer and the second gas diffusion layer are placed inside the opening. When the fuel cell is viewed from a direction perpendicular to the electrolyte membrane, a first region and a second region are present, the first region being a region where the second gas diffusion layer is present, the second region being a region between an outer peripheral edge part of the second gas diffusion layer and an inner peripheral edge part of the opening of the support frame. The manufacturing method includes a step of sequentially placing the first catalyst layer and the first gas diffusion layer on the first surface of the electrolyte membrane. The manufacturing method includes a first pressure bonding step of bonding, by pressure, the first gas diffusion layer, the first catalyst layer, and the electrolyte membrane in the first region to each other at a first temperature. The manufacturing method includes a second pressure bonding step of bonding, by pressure, the first gas diffusion layer, the first catalyst layer, and the electrolyte membrane in the second region to each other at a second temperature higher than the first temperature. The manufacturing method includes a placing step of, after the first and second pressure bonding steps, placing the second catalyst layer, the second gas diffusion layer, and the support frame on a second surface of the electrolyte membrane. This allows the bonding power between the first catalyst layer and the first gas diffusion layer to be made smaller in the first region than in the second region. Further, this allows the bonding power between the electrolyte membrane and the first catalyst layer to be smaller in the first region than in the second region.

A pressure in the first pressure bonding step may be lower than a pressure in the second pressure bonding step. The bonding power between the first catalyst layer and the first gas diffusion layer can be made smaller in the first region than in the second region. Further, the bonding power between the electrolyte membrane and the first catalyst layer can be made smaller in the first region than in the second region.

The first pressure bonding step and the second pressure bonding step may be performed at the same time. This makes it possible to shorten time for the pressure bonding steps.

The placing step may include a step of placing the second catalyst layer on the second surface of the electrolyte membrane. The placing step may include a step of placing the second gas diffusion layer on the second catalyst layer. The placing step may include a third pressure bonding step of bonding, by pressure, the first gas diffusion layer, the first catalyst layer, the electrolyte membrane, the second catalyst layer, and the second gas diffusion layer in the first region to each other at a third temperature lower than the second temperature. This allows the bonding power between the second catalyst layer and the second gas diffusion layer to be smaller in the first region than in the second region. Further, this allows the bonding power between the electrolyte membrane and the second catalyst layer to be smaller in the first region than in the second region.

The placing step may include a step of placing the second catalyst layer on the second surface of the electrolyte membrane. The placing step may include a step of placing an adhesive layer in a region outside an outer peripheral edge part of the second catalyst layer, on the second surface of the electrolyte membrane. The placing step may include a step of placing the support frame on the adhesive layer. The placing step may include a step of placing the second gas diffusion layer on the second catalyst layer. Due to the adhesive layer, it is possible to fix the support frame to the outer periphery of the electrolyte membrane.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of MEGA Sheet 1

Figure 1:
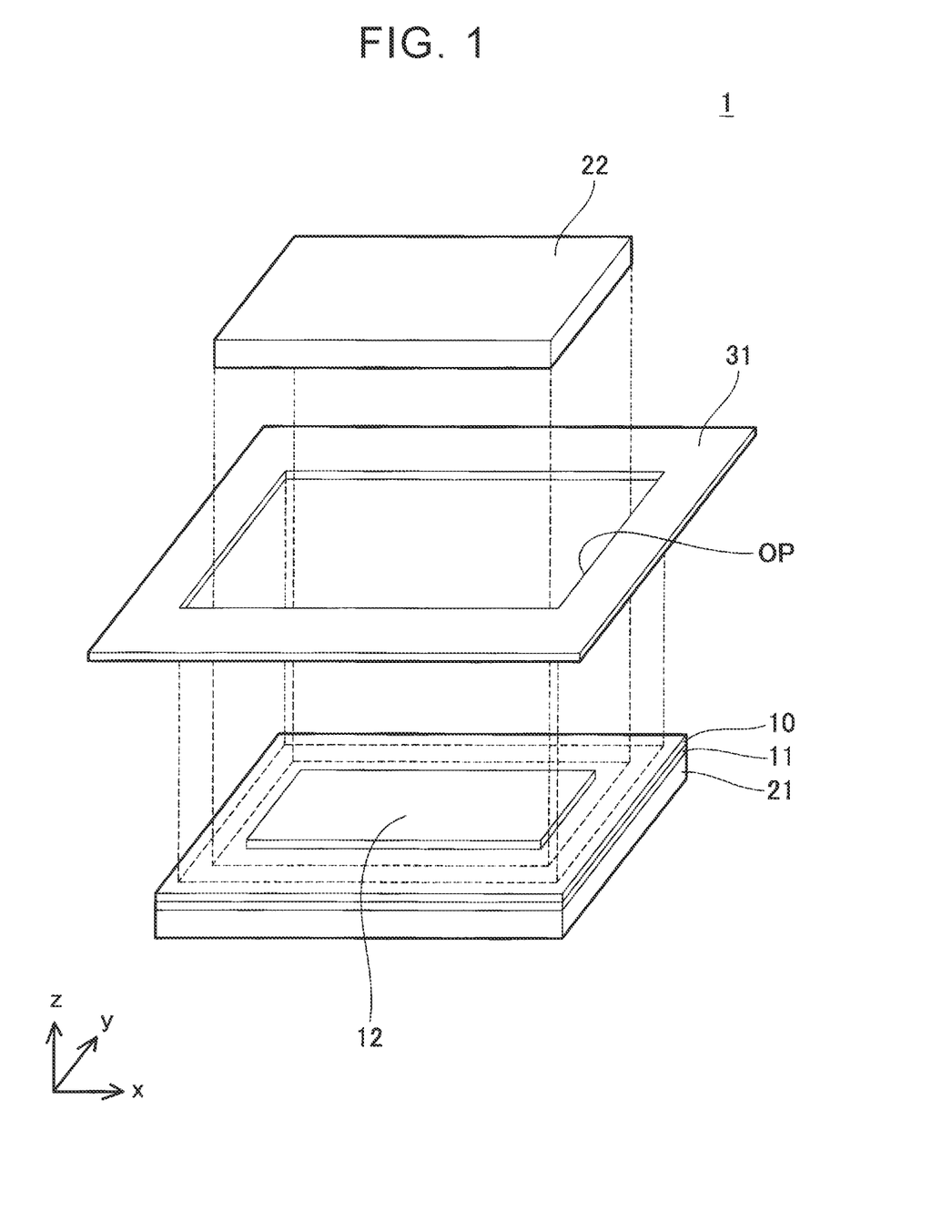
FIG. 1 is an exploded perspective view of a MEGA sheet 1.
Figure 2:
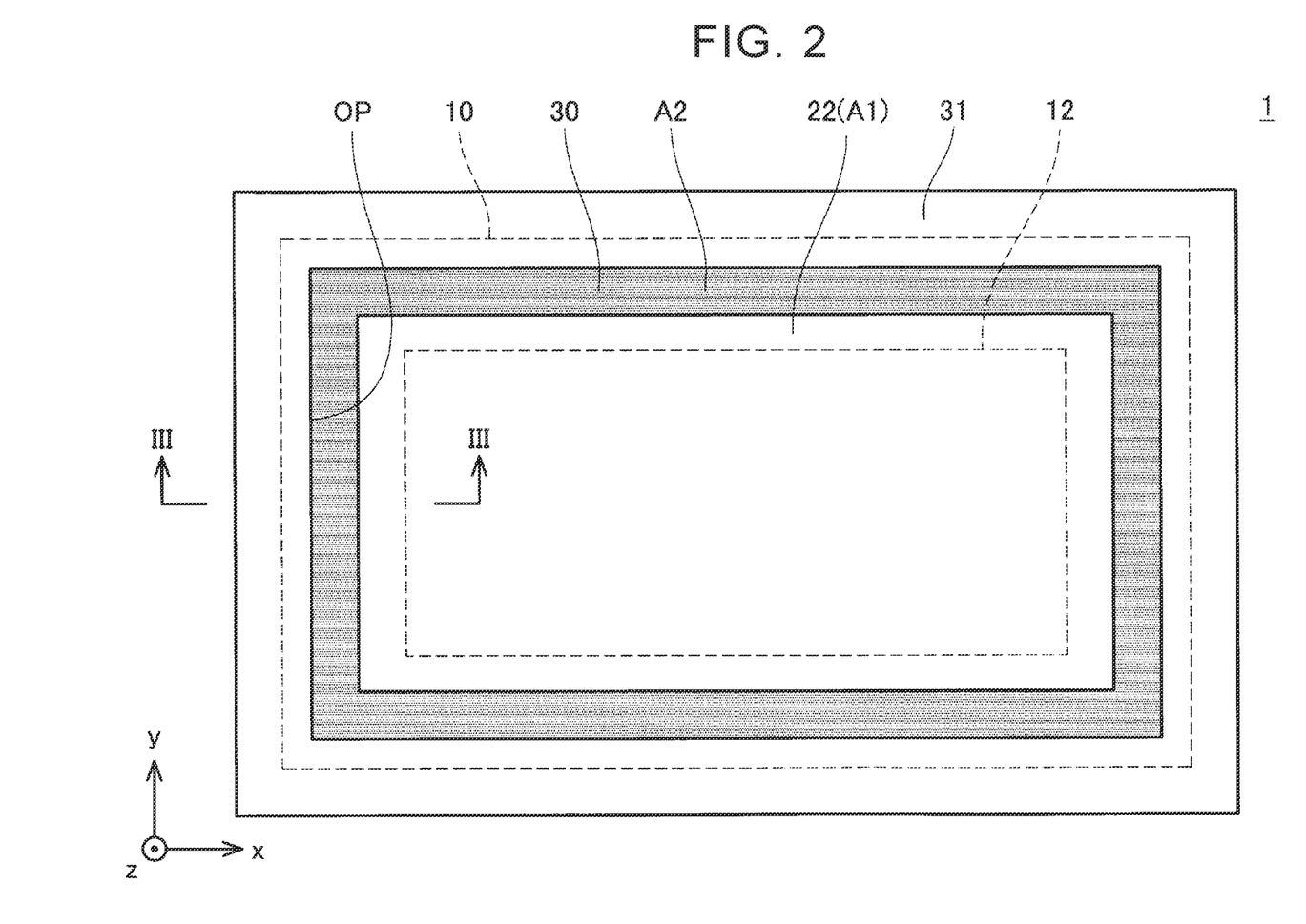
FIG. 2 is a top view of the MEGA sheet 1.
Figure 3:
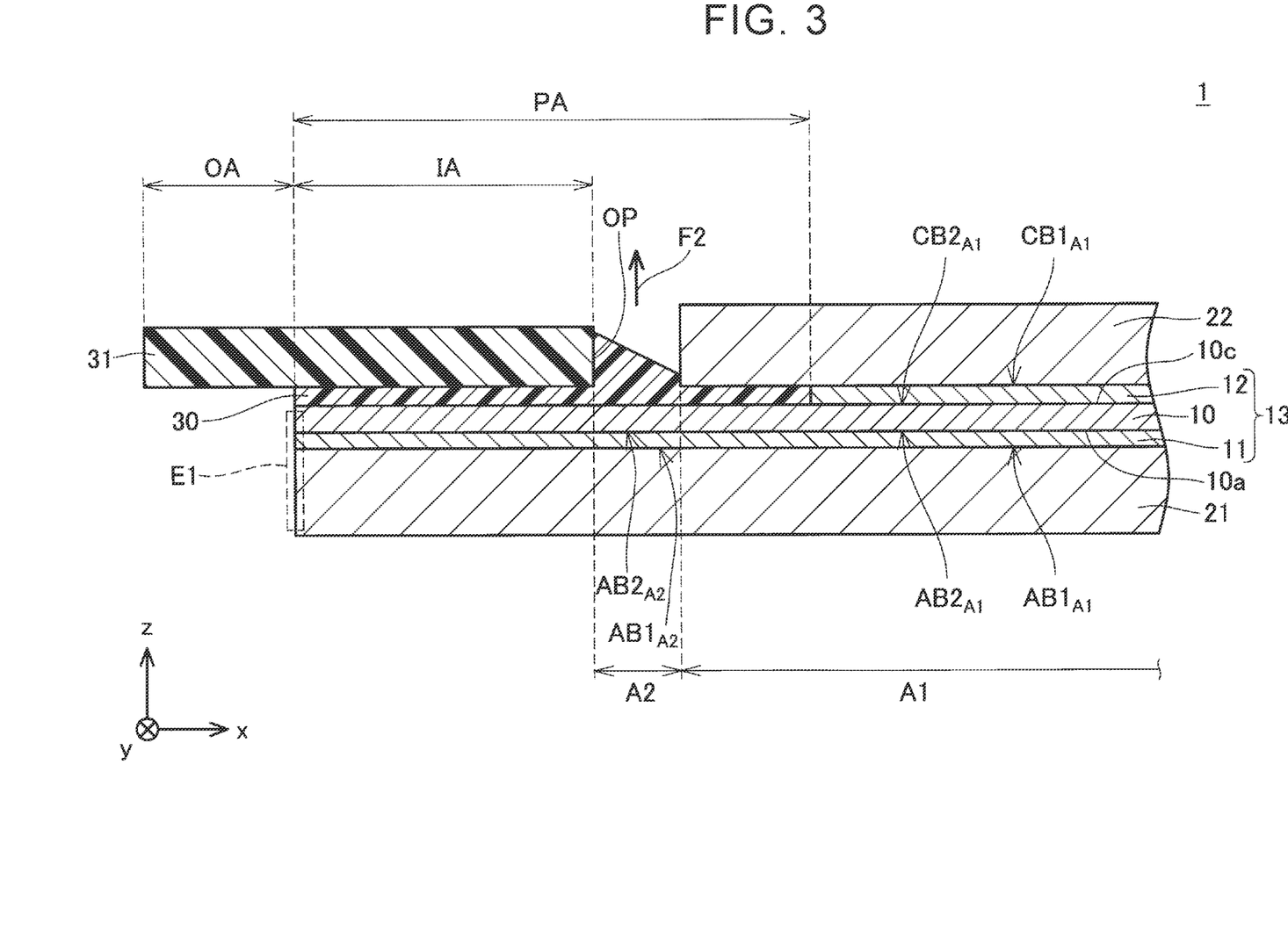
FIG. 3 is a partial sectional view taken along a line in FIG. 2.

FIG. 1 is an exploded perspective view of a membrane electrode gas diffusion layer assembly (MEGA) sheet 1. FIG. 2 is a top view of the MEGA sheet 1. FIG. 3 is a partial sectional view taken along a line III-III in FIG. 2. The MEGA sheet 1 is a power generator sheet for a fuel cell. The MEGA sheet 1 constitutes a fuel cell such that the MEGA sheet 1 is sandwiched between an anode-side separator and a cathode-side separator (not illustrated). The MEGA sheet 1 includes an electrolyte membrane 10, an anode catalyst layer 11, a cathode catalyst layer 12, an anode-gas diffusion layer 21, a cathode-gas diffusion layer 22, an adhesive layer 30, and a support frame 31.

The electrolyte membrane 10 is a proton conducting ion-exchange membrane made of a solid polymeric material. The anode catalyst layer 11 and the cathode catalyst layer 12 are porous layers configured such that carbon particles carrying catalyst such as platinum are connected to each other via resin. The electrolyte membrane 10, the anode catalyst layer 11, and the cathode catalyst layer 12 have a rectangular shape. The electrolyte membrane 10, the anode catalyst layer 11, and the cathode catalyst layer 12 constitute a rectangular membrane electrode assembly (MEA) 13. The anode-gas diffusion layer 21 and the cathode-gas diffusion layer 22 are conductive members having gas permeability. Examples of the conductive members are a carbon porous body (e.g., carbon paper, carbon cloth, and the like), a metal porous body (e.g., a metal mesh, a foam metal, and the like), and so on. The anode-gas diffusion layer 21 and the cathode-gas diffusion layer 22 have a rectangular shape.

The anode catalyst layer 11 and the anode-gas diffusion layer 21 have a magnitude equivalent to the magnitude of the electrolyte membrane 10. The cathode catalyst layer 12 and the cathode-gas diffusion layer 22 are smaller than the electrolyte membrane 10. Further, the cathode catalyst layer 12 is smaller than the cathode-gas diffusion layer 22.

The adhesive layer 30 is a layer made of an applied adhesive. Examples of the adhesive include an adhesive containing organic solvent and having ultra-violet hardenability. The support frame 31 is a member for supporting the electrolyte membrane 10, the anode catalyst layer 11, the cathode catalyst layer 12, the anode-gas diffusion layer 21, and the cathode-gas diffusion layer 22. The support frame 31 has a frame shape having an opening OP. The opening OP is larger than the cathode catalyst layer 12 and the cathode-gas diffusion layer 22. The support frame 31 has a three-layer sheet structure in which an adhesive layer made of thermoplastic resin is placed on either sides of a frame layer made of thermosetting resin.

As illustrated in FIG. 3, the anode catalyst layer 11 is placed on a surface 10a on an anode side (a negative z-direction side) of the electrolyte membrane 10. The anode-gas diffusion layer 21 is placed on the anode catalyst layer 11. Respective outer peripheral edge parts of the electrolyte membrane 10, the anode catalyst layer 11, and the anode-gas diffusion layer 21 overlap each other in an edge portion E1.

The cathode catalyst layer 12 is placed on a surface 10c on a cathode side (a positive z-direction side) of the electrolyte membrane 10 such that the cathode catalyst layer 12 is placed inwardly from the outer periphery of the electrolyte membrane 10. A frame-shaped outer peripheral region PA is formed on the surface 10c of the electrolyte membrane 10. No cathode catalyst layer 12 is formed in the outer peripheral region PA. The adhesive layer 30 is placed on the surface 10c inside the outer peripheral region PA. The cathode-gas diffusion layer 22 is placed on the cathode catalyst layer 12 such that the cathode-gas diffusion layer 22 is placed inwardly from the outer periphery of the electrolyte membrane 10. The cathode catalyst layer 12 is placed inwardly from the outer periphery of the cathode-gas diffusion layer 22.

As illustrated in FIG. 3, the frame-shaped support frame 31 has an inner peripheral region IA and an outer peripheral region OA. The inner peripheral region IA is bonded to the surface 10c on the cathode side of the electrolyte membrane 10 via the adhesive layer 30. The outer peripheral region OA projects from the outer periphery of the electrolyte membrane 10 and forms a flange. When the adhesive layer 30 is viewed from a direction perpendicular to the electrolyte membrane 10, the adhesive layer 30 is placed at least in the inner peripheral region IA and a second region A2 where the support frame 31 is present.

As illustrated in FIG. 2, a first region A1 and the second region A2 are formed when the MEGA sheet 1 is viewed from a direction perpendicular to the electrolyte membrane 10. The first region A1 is a region where the cathode-gas diffusion layer 22 is present. The second region A2 is a region between an outer peripheral edge part of the cathode-gas diffusion layer 22 and an inner peripheral edge part of the opening OP of the support frame 31. In FIG. 2, the second region A2 is illustrated in gray for easiness to understand.

In the MEGA sheet 1 according to the present embodiment, bonding powers of boundary surfaces between layers have the following relationships (see FIG. 3). The bonding force of a boundary surface $AB1_{A1}$ between the anode catalyst layer 11 and the anode-gas diffusion layer 21 in the first region A1 is smaller than the bonding force of a boundary surface $AB1_{A2}$ between the anode catalyst layer 11 and the anode-gas diffusion layer 21 in the second region A2. The bonding force of a boundary surface $AB2_{A1}$ between the electrolyte membrane 10 and the anode catalyst layer 11 in the first region A1 is smaller than the bonding force of a boundary surface $AB2_{A2}$ between the electrolyte membrane 10 and the anode catalyst layer 11 in the second region A2.

Further, respective bonding strengths of the boundary surfaces between the layers have the following relationships. The bonding force of a boundary surface $CB1_{A1}$ between the cathode catalyst layer 12 and the cathode-gas diffusion layer 22 in the first region A1 is smaller than the bonding force of the boundary surface $AB1_{A2}$ between the anode catalyst layer 11 and the anode-gas diffusion layer 21 in the second region A2. The bonding force of a boundary surface $CB2_{A1}$ between the electrolyte membrane 10 and the cathode catalyst layer 12 in the first region A1 is smaller than the bonding force of the boundary surface $AB2_{A2}$ between the electrolyte membrane 10 and the anode catalyst layer 11 in the second region A2. Note that magnitudes of the bonding powers of various boundary surfaces can be evaluated objectively by measuring peel states and peel strengths obtained when a load is applied to the boundary surfaces.

Manufacturing Method of MEGA Sheet 1

Figure 4:
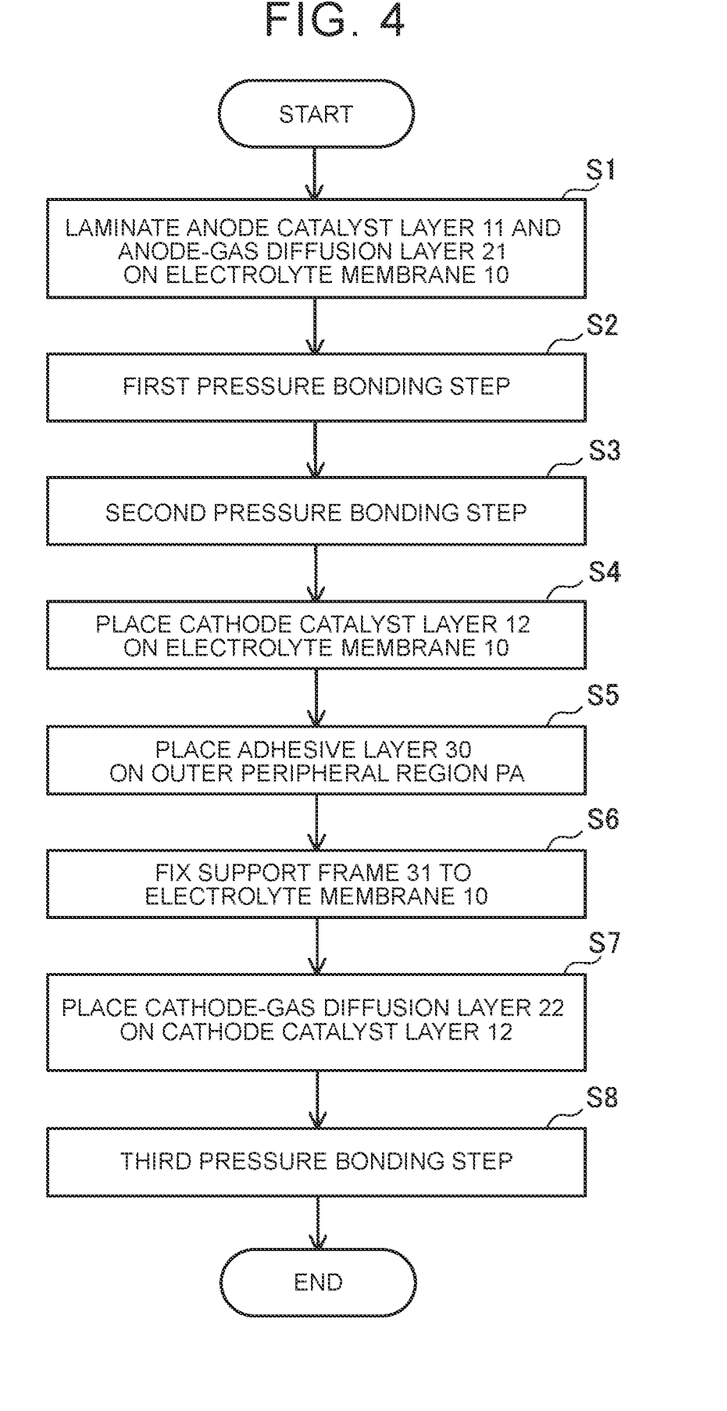
FIG. 4 is a flow diagram to describe a manufacturing method of the MEGA sheet 1.
Figure 5:
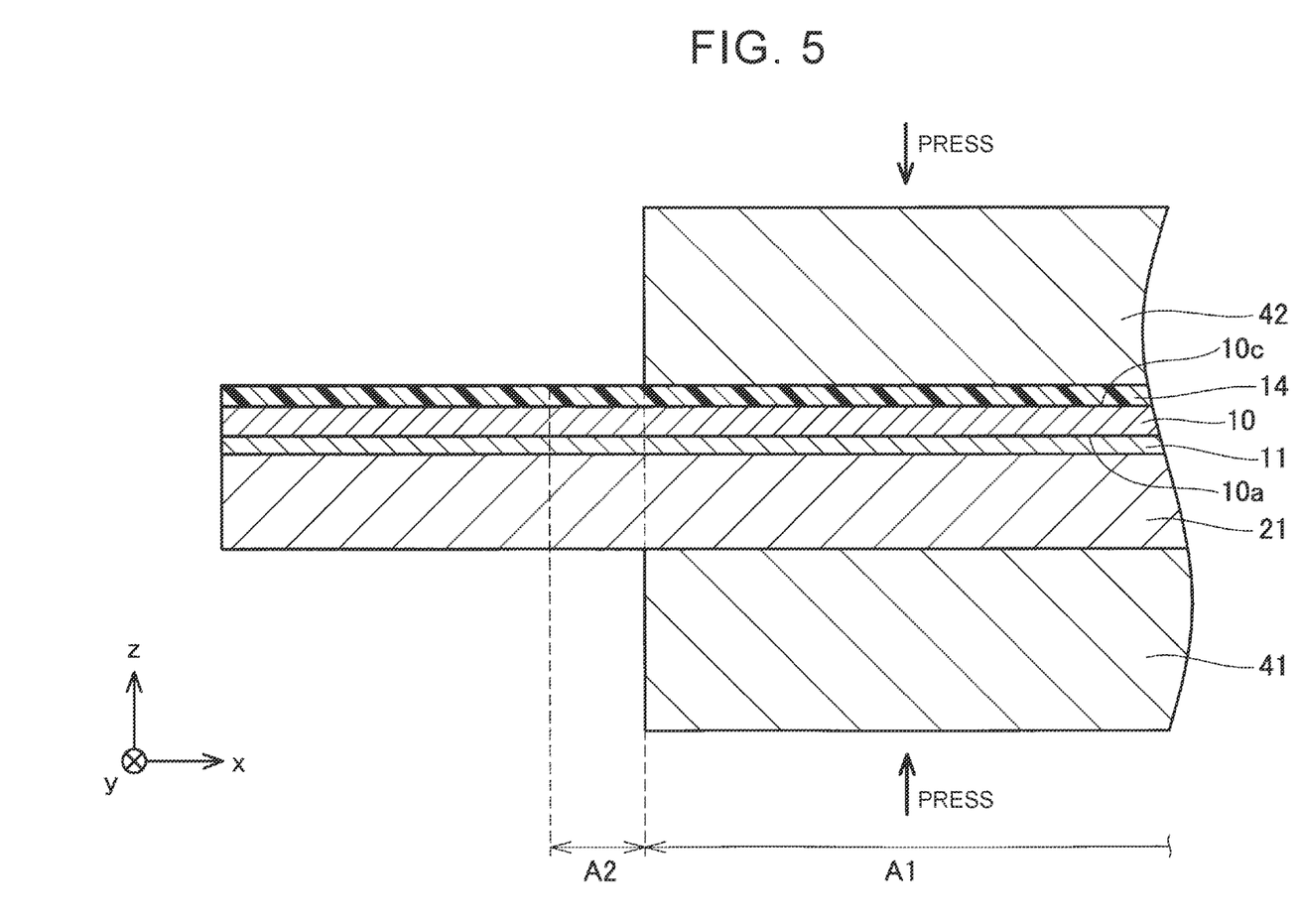
FIG. 5 is a partial sectional view to describe the manufacturing method of the MEGA sheet 1.

With reference to the procedure of FIG. 4 and the sectional views of FIGS. 5 to 9, the following describes a manufacturing method of the MEGA sheet 1. In step S1, the electrolyte membrane 10 in which the surface 10c on the cathode side is protected by a protective film 14 is prepared. The anode catalyst layer 11 and the anode-gas diffusion layer 21 are sequentially laminated on the surface 10a on the anode side of the electrolyte membrane 10 (FIG. 5). In step S2, a first pressure bonding step is performed. More specifically, the anode-gas diffusion layer 21, the anode catalyst layer 11, and the electrolyte membrane 10 are pressed by rectangular press plates 41, 42 corresponding to the first region A1 (FIG. 5). The first pressure bonding is performed at room temperature. The protective film 14 can prevent contamination on the surface 10c of the electrolyte membrane 10.

Figure 6:
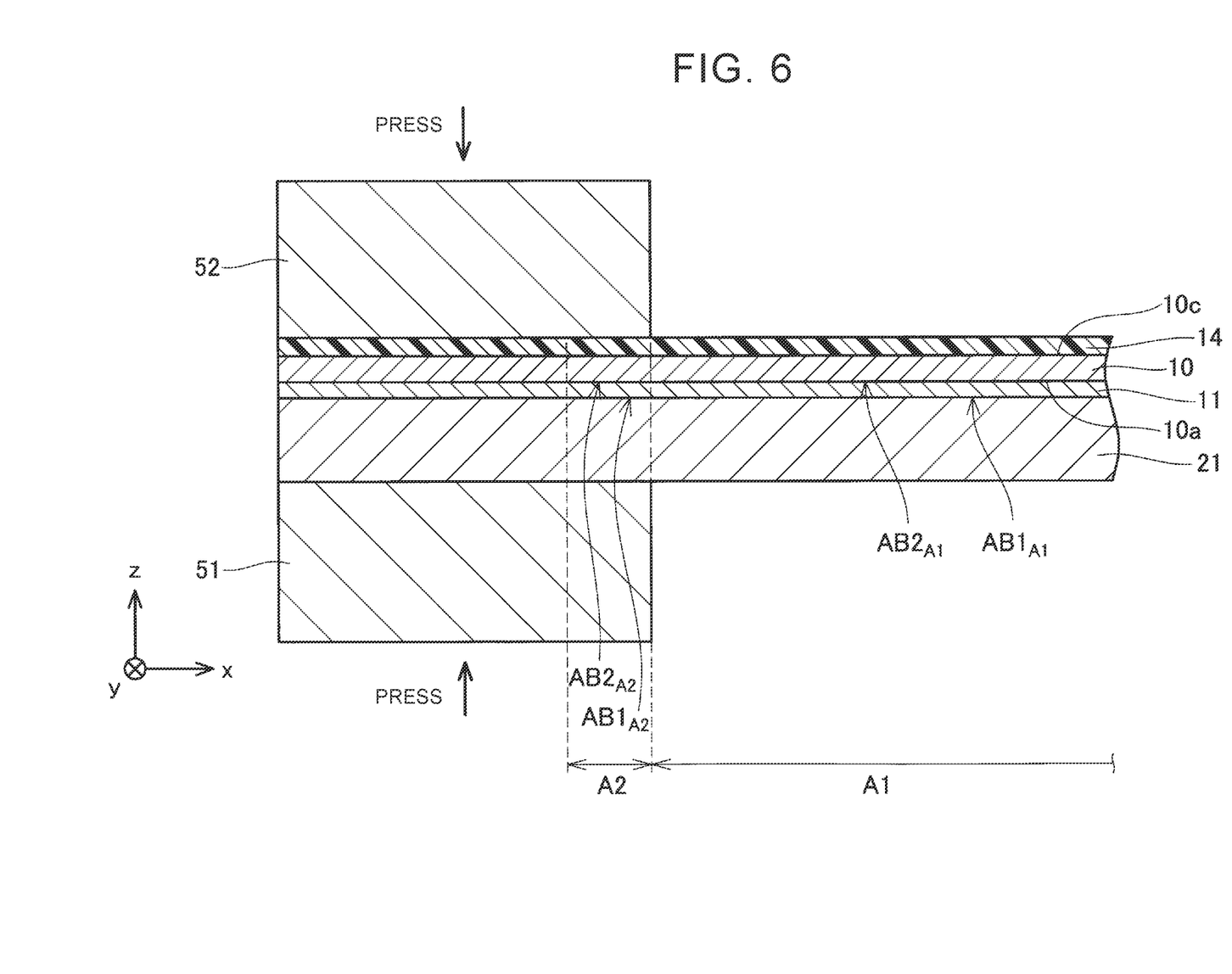
FIG. 6 is a partial sectional view to describe the manufacturing method of the MEGA sheet 1.

In step S3, a second pressure bonding step is performed. More specifically, the anode-gas diffusion layer 21, the anode catalyst layer 11, and the electrolyte membrane 10 are pressed by frame-shaped press plates 51, 52 corresponding to the second region A2 (FIG. 6). The second pressure bonding is performed at a temperature higher than that for the first pressure bonding. Further, the pressure used in the second pressure bonding step is equal to or higher than the pressure used in the first pressure bonding step. Further, the protective film 14 can prevent contamination on the surface 10c of the electrolyte membrane 10.

Hereby, the bonding force of the boundary surface $AB1_{A1}$ (the boundary surface between the anode catalyst layer 11 and the anode-gas diffusion layer 21 in the first region A1) is made smaller than the bonding force of the boundary surface $AB1_{A2}$ (the boundary surface between the anode catalyst layer 11 and the anode-gas diffusion layer 21 in the second region A2). Further, the bonding force of the boundary surface $AB2_{A1}$ (the boundary surface between the electrolyte membrane 10 and the anode catalyst layer 11 in the first region A1) is made smaller than the bonding force of the boundary surface $AB2_{A2}$ (the boundary surface between the electrolyte membrane 10 and the anode catalyst layer 11 in the second region A2).

Figure 7:
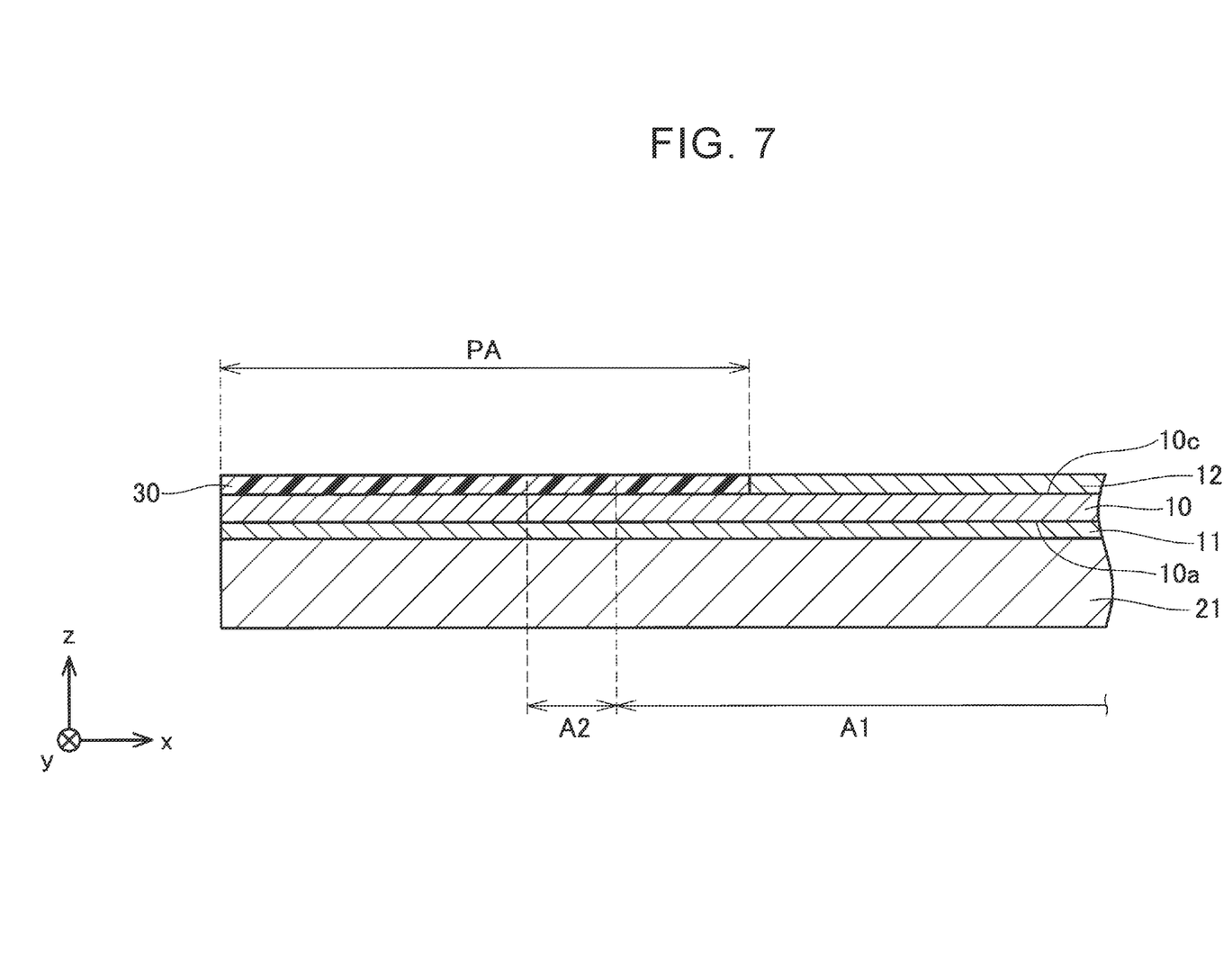
FIG. 7 is a partial sectional view to describe the manufacturing method of the MEGA sheet 1.

In step S4, the protective film 14 is removed. Then, the cathode catalyst layer 12 is disposed on the surface 10c on the cathode side of the electrolyte membrane 10. In step S5, the adhesive layer 30 is placed in the outer peripheral region PA (that is, a region outside an outer peripheral edge part of the cathode catalyst layer 12) on the surface 10c of the electrolyte membrane 10. Hereby, the structure of FIG. 7 is formed.

Figure 8:
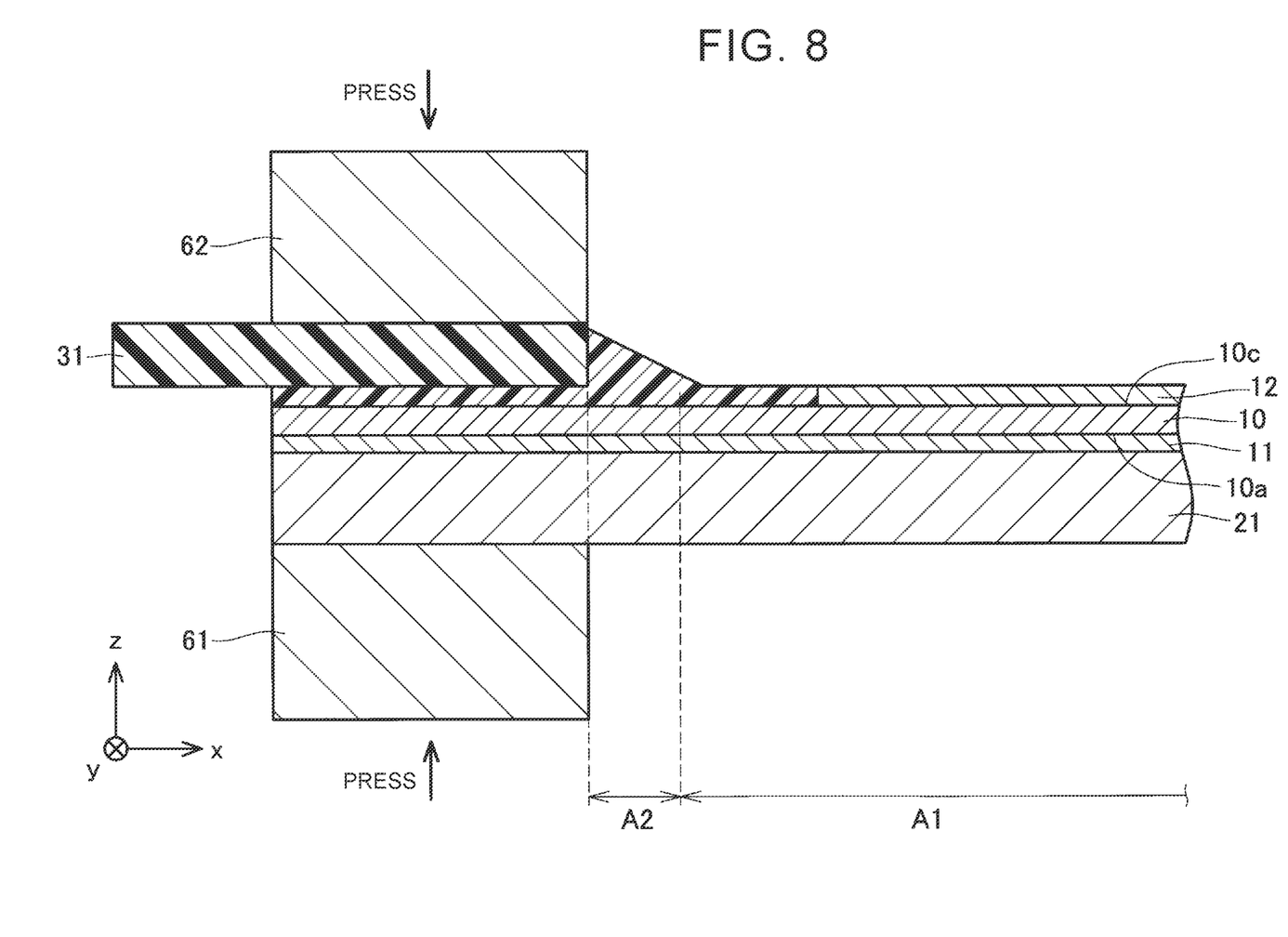
FIG. 8 is a partial sectional view to describe the manufacturing method of the MEGA sheet 1.

In step S6, the support frame 31 is placed on the adhesive layer 30 (FIG. 8). Then, the support frame 31 is bonded by pressure to the adhesive layer 30 by press plates 61, 62 corresponding to the support frame 31 (FIG. 8). After that, the adhesive layer 30 is irradiated with UV via the support frame 31 so that the adhesive layer 30 is cured. In step S7, the cathode-gas diffusion layer 22 is placed on the cathode catalyst layer 12.

Figure 9:
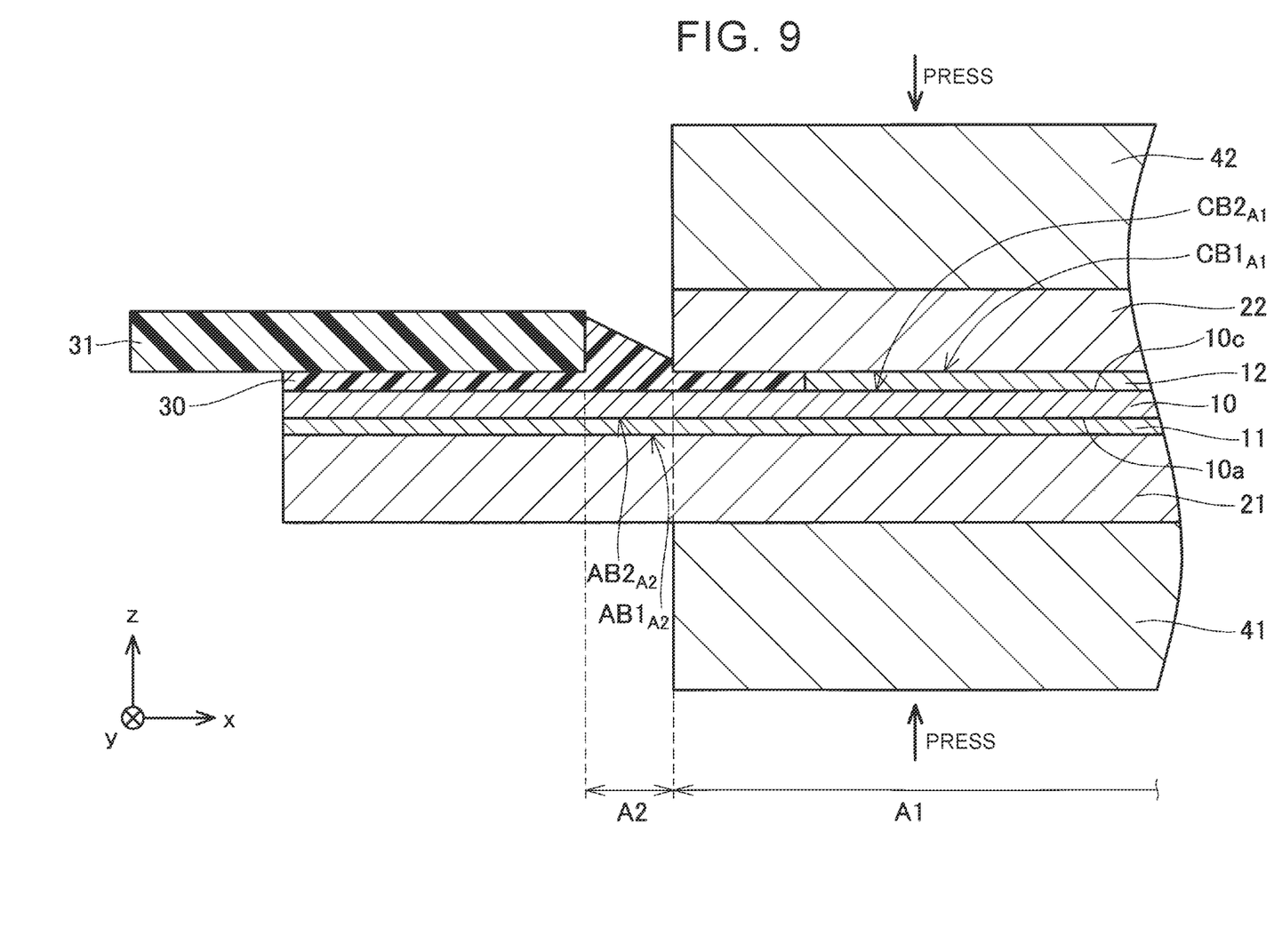
FIG. 9 is a partial sectional view to describe the manufacturing method of the MEGA sheet 1.

In step S8, a third pressure bonding step is performed. More specifically, the anode-gas diffusion layer 21, the anode catalyst layer 11, the electrolyte membrane 10, the cathode catalyst layer 12, and the cathode-gas diffusion layer 22 are bonded by pressure by the press plates 41, 42 corresponding to the first region A1 (FIG. 9). Hereby, the MEGA sheet 1 is completed.

The third pressure bonding is performed at a temperature lower than that for the second pressure bonding. Further, the pressure used in the third pressure bonding step is smaller than the pressure used in the second pressure bonding step. Hereby, the bonding force of the boundary surface $CB1_{A1}$ (the boundary surface between the cathode catalyst layer 12 and the cathode-gas diffusion layer 22 in the first region A1) is made smaller than the bonding force of the boundary surface $AB1_{A2}$ (the boundary surface between the anode catalyst layer 11 and the anode-gas diffusion layer 21 in the second region A2). Further, the bonding force of the boundary surface $CB2_{A1}$ (the boundary surface between the electrolyte membrane 10 and the cathode catalyst layer 12 in the first region A1) is made smaller than the bonding force of the boundary surface $AB2_{A2}$ (the boundary surface between the electrolyte membrane 10 and the anode catalyst layer 11 in the second region A2).

Obtainable Effect due to Reduction in Bonding Powers of Boundary Surface $AB1_{A1}$ and Boundary Surface $CB1_{A1}$ of First Region A1

Figure 10:
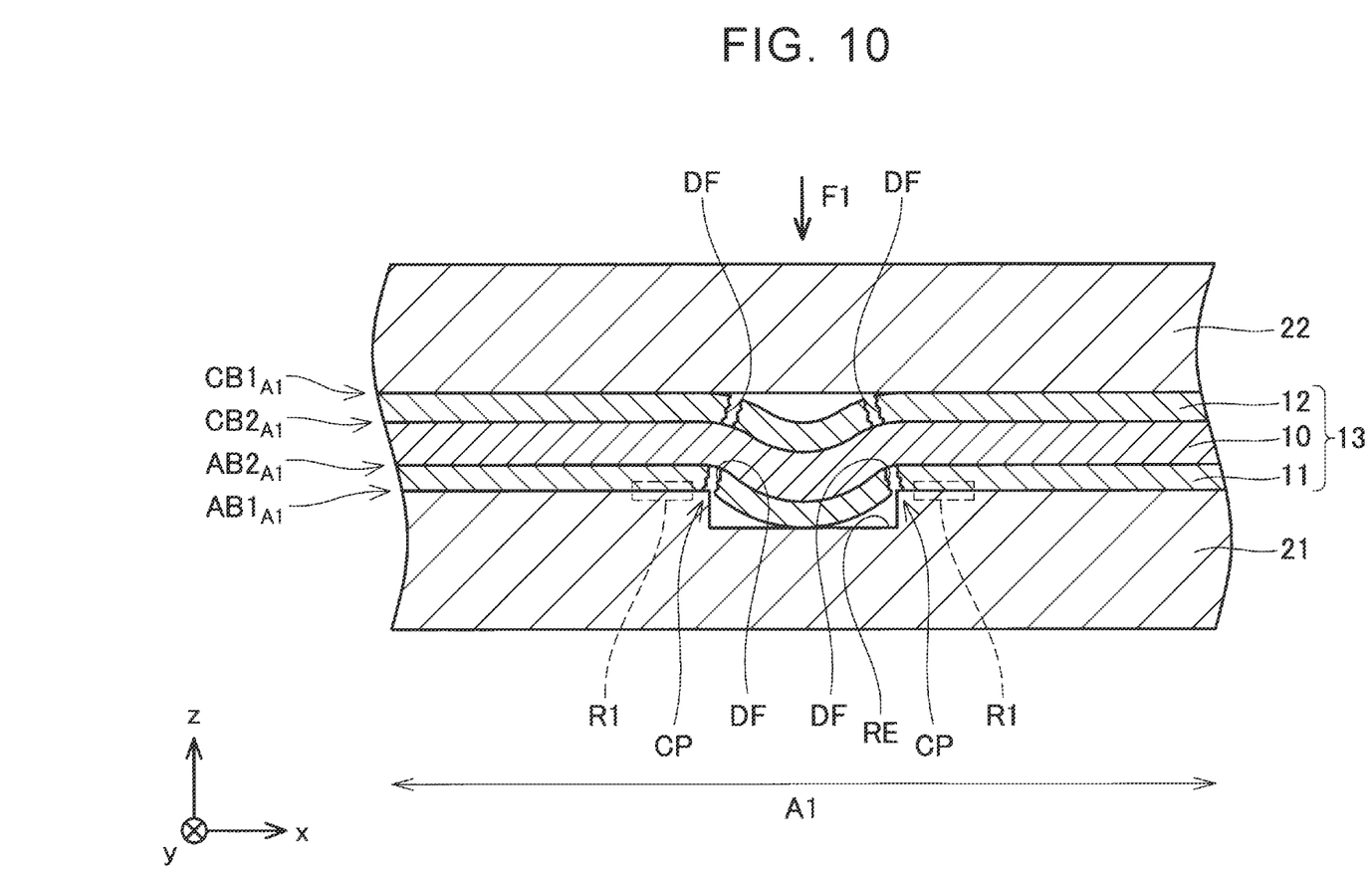
FIG. 10 is a view to describe a phenomenon to occur on a MEGA sheet in a comparative example.

As a comparative example, a phenomenon occurring when the bonding power of the boundary surface $AB1_{A1}$ in the first region A1 is set to be equal to or higher than the bonding power of the boundary surface $AB1_{A2}$ in the second region A2 will be described with reference to FIG. 10. Since power generation is performed in the first region A1 where the cathode-gas diffusion layer 22 is present, a swelling amount of the electrolyte membrane 10 changes due to a change of an amount of generated water, so that the dimension of the electrolyte membrane 10 changes. Further, due to a pressure difference between the anode side (the negative z-direction side) and the cathode side (the positive z-direction side) of the MEA 13, a pressure F1 directed from the cathode side toward the anode side may be applied to the MEA 13. Since the anode-gas diffusion layer 21 has a rigidity higher than that of the MEA 13, the anode-gas diffusion layer 21 functions to restrain the MEA 13 from deforming to the anode side. However, recesses and projections are present on the surface of the anode-gas diffusion layer 21. Accordingly, a local recessed portion RE as illustrated in FIG. 10 is present. When a pressure F1 is applied in a state where the electrolyte membrane 10 swells, the MEA 13 moves into the recessed portion RE. At this time, since the bonding power of the boundary surface $AB1_{A1}$ is high, a state where the anode catalyst layer 11 is bonded by pressure to the anode-gas diffusion layer 21 is maintained in peripheral regions R1 around the recessed portion RE. On that account, the MEA 13 deforms locally in the recessed portion RE. As a result, the MEA 13 deforms to bend from corner parts CP as fulcrums. The corner parts CP are present in an edge of the recessed portion RE. Stress concentration occurs on the corner parts CP, so that the anode catalyst layer 11 and the cathode catalyst layer 12 crack to cause defects DF. The defects DF cause a breakage of the electrolyte membrane 10.

Figure 11:
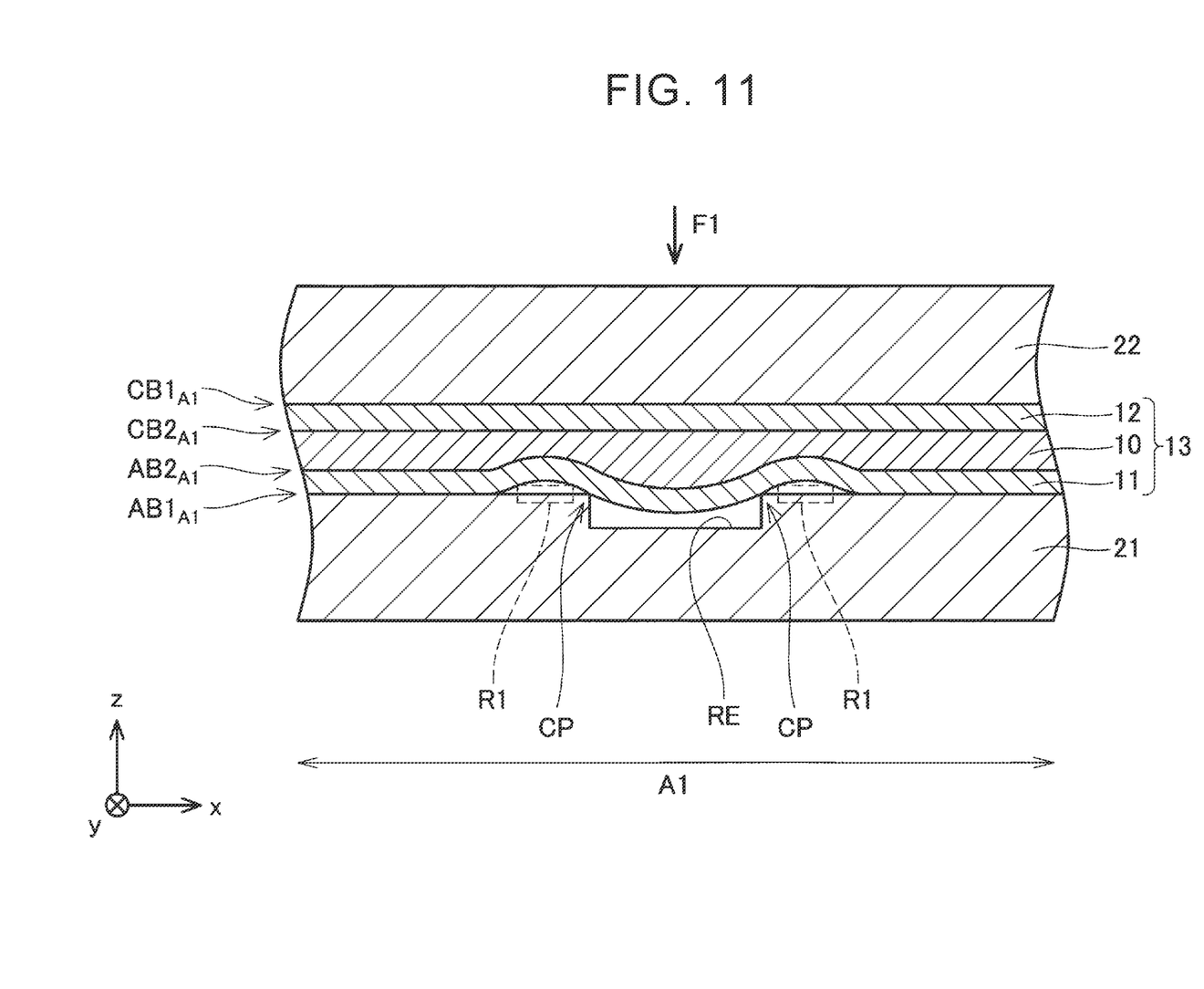
FIG. 11 is a view to describe an effect of the MEGA sheet 1 of the present specification.

In the MEGA sheet 1 of the present specification, the bonding power of the boundary surface $AB1_{A1}$ is smaller than the bonding power of the boundary surface $AB1_{A2}$. Hereby, as illustrated in FIG. 11, in a case where the pressure F1 is applied in the state where the electrolyte membrane 10 swells, it is possible to separate the anode catalyst layer 11 from the anode-gas diffusion layer 21 in the peripheral regions R1 around the recessed portion RE. That is, the MEA 13 can be deformed widely in a wide range including regions around the recessed portion RE. As a result, it is possible to prevent the MEA 13 from deforming to bend from the corner parts CP as fulcrums. This can restrain stress concentration at the corner parts CP, thereby making it possible to prevent occurrence of defects in the anode catalyst layer 11.

Further, in the MEGA sheet 1 of the present specification, the bonding power of the boundary surface $CB1_{A1}$ in the first region A1 is also made small. The effect obtainable hereby is similar to the effect obtainable when the bonding power of the boundary surface $AB1_{A1}$ is made small. That is, in a case where a pressure directed from the anode side toward the cathode side is applied to the MEA 13, it is possible to prevent the MEA 13 from deforming to bend at the recessed portion of the cathode-gas diffusion layer 22.

Obtainable Effect due to Reduction in Bonding Powers of Boundary Surface $AB2_{A1}$ and Boundary Surface $CB2_{A1}$ in First Region A1

As illustrated in FIG. 10, a defect DF may occur in the anode catalyst layer 11. Here, in a case where the bonding power of the boundary surface $AB2_{A1}$ is higher than necessary, a state where the electrolyte membrane 10 makes contact with the anode catalyst layer 11 is maintained at the defect DF. On this account, a stress concentrates on the electrolyte membrane 10 with a contact boundary surface between the electrolyte membrane 10 and the anode catalyst layer 11 at the defect DF being serving as a starting point. The electrolyte membrane 10 may break. Here, in the MEGA sheet 1 of the present specification, the bonding power of the boundary surface $AB2_{A1}$ in the first region A1 is made smaller than the bonding power of the boundary surface $AB2_{A2}$ in the second region A2. That is, the bonding power of the boundary surface $AB2_{A1}$ does not become higher than necessary. Hereby, in a case where the defect DF occurs, the electrolyte membrane 10 can be separated from the contact boundary surface between the electrolyte membrane 10 and the anode catalyst layer 11 near the defect DF. Even in a case where the defect DF occurs, it is possible to restrain a stress from concentrating on the electrolyte membrane 10, thereby making it possible to prevent a breakage of the electrolyte membrane 10.

Further, in the MEGA sheet 1 of the present specification, the bonding power of the boundary surface $CB2_{A1}$ in the first region A1 is also made small. The effect obtainable hereby is similar to the effect obtainable when the bonding power of the boundary surface $AB2_{A1}$ made small. That is, in a case where a defect DF occurs in the cathode catalyst layer 12, the electrolyte membrane 10 can be separated from a contact boundary surface between the electrolyte membrane 10 and the cathode catalyst layer 12 near the defect DF. It is possible to restrain a stress from concentrating on the electrolyte membrane 10.

Obtainable Effect due to Increase in Bonding Powers of Boundary Surfaces $AB1_{A2}$ and Boundary Surface $AB2_{A2}$ in Second Region A2

A pressure difference is caused between the anode side (the negative z-direction side) and the cathode side (the positive z-direction side) of the MEA 13. Since the anode-gas diffusion layer 21, the cathode-gas diffusion layer 22, and the support frame 31 have rigidities higher than that of the MEA 13, they have a function to support the electrolyte membrane 10 such that the electrolyte membrane 10 does not deform due to the pressure difference. Besides, the cathode-gas diffusion layer 22 and the support frame 31 are not present on the cathode side of the second region A2 (FIG. 3). Accordingly, a force F2 directed toward the cathode side is applied to the electrolyte membrane 10 in the second region A2 due to the pressure difference.

In the MEGA sheet 1 of the present specification, the bonding power of the boundary surface $AB1_{A2}$ in the second region A2 is made higher than the bonding power of the boundary surface $AB1_{A1}$ in the first region A1. Hereby, even in a case where a force F2 is applied to the electrolyte membrane 10 and the anode catalyst layer 11 in the second region A2, it is possible to restrain the anode catalyst layer 11 from peeling from the surface of the anode-gas diffusion layer 21. This makes it possible to prevent such a situation that the electrolyte membrane 10 breaks.

Further, in the MEGA sheet 1 of the present specification, the bonding power of the boundary surface $AB2_{A2}$ in the second region A2 is made higher than the bonding power of the boundary surface $AB2_{A1}$ in the first region A1. Hereby, even in a case where the force F2 is applied to the electrolyte membrane 10 and the anode catalyst layer 11 in the second region A2, it is possible to restrain the electrolyte membrane 10 from peeling from a pressure-bonding boundary surface between the anode catalyst layer 11 and the electrolyte membrane 10. This makes it possible to prevent such a situation that the electrolyte membrane 10 breaks.

The embodiment has been described above in detail, but the embodiment is only an example and does not limit the scope of Claims. The technology described in the scope of Claims includes the foregoing concrete examples with various modifications and changes. Each of and various combinations of the technical elements described in the present specification or the drawings achieve a technical usefulness, and the technical elements are not limited to the combination stated in the claims at the time of filing. Further, the technology described in the present specification or the drawings can achieve a plurality of objects at the same time and has a technical usability by achieving one of those objects.

Modifications

The first pressure bonding step (S2) and the second pressure bonding step (S3) may be performed at the same time. For example, the rectangular press plates 41, 42 (FIG. 5) and the frame-shaped press plates 51, 52 (FIG. 6) may be pressed at the same time. Since the press plates 41, 42 and the press plates 51, 52 are separated bodies, their temperatures and pressures are controllable individually.

In the first pressure bonding step (S2), the second pressure bonding step (S3), and the third pressure bonding (S8), a method for adjusting the bonding powers of the boundary surfaces is not limited to a method in which different temperatures and different pressures are employed, and various methods can be used. For example, the bonding powers of the boundary surfaces can be adjusted by time to perform pressure bonding.

The order to perform the first pressure bonding step (S2), the second pressure bonding step (S3), and the step of placing the cathode catalyst layer 12 (S4) is not limited to the example of the present embodiment, and those steps can be performed in various combinations. For example, the first pressure bonding step and the second pressure bonding step may be performed in an order reverse to the above. Further, for example, the first pressure bonding step and the second pressure bonding step may be performed after the cathode catalyst layer 12 is placed.

A microporous layer (MPL) made of resin and having a minute porous structure may be provided on a surface, on the electrolyte membrane 10 side, of the anode-gas diffusion layer 21 or the cathode-gas diffusion layer 22. The microporous layer can be formed, for example, such that an MPL application member is applied onto the surface of the anode-gas diffusion layer 21 or the cathode-gas diffusion layer 22 and then dried.

The anode catalyst layer 11 is one example of a first catalyst layer. The anode-gas diffusion layer 21 is one example of a first gas diffusion layer. The cathode catalyst layer 12 is one example of a second catalyst layer. The cathode-gas diffusion layer 22 is one example of a second gas diffusion layer.

What is claimed is:

1. A fuel cell comprising:
   an electrolyte membrane;
   first and second catalyst layers;
   first and second gas diffusion layers; and
   a support frame, wherein:
   the first catalyst layer is placed on a first surface of the electrolyte membrane;
   the first gas diffusion layer is placed on the first catalyst layer;
   the second catalyst layer smaller than the electrolyte membrane is placed on a second surface of the electrolyte membrane such that the second catalyst layer is placed inwardly from an outer periphery of the electrolyte membrane;
   the second gas diffusion layer smaller than the electrolyte membrane is placed on the second catalyst layer such that the second gas diffusion layer is placed inwardly from the outer periphery of the electrolyte membrane;
   the support frame includes an opening larger than the second catalyst layer and the second gas diffusion layer and is placed on the second surface of the electrolyte membrane such that the second catalyst layer and the second gas diffusion layer are placed inside the opening;
   when the fuel cell is viewed from a direction perpendicular to the electrolyte membrane, a first region and a second region are present, the first region being a region where the second gas diffusion layer is present, the second region being a region between an outer peripheral edge part of the second gas diffusion layer and an inner peripheral edge part of the opening of the support frame; and a bonding power between the first catalyst layer and the first gas diffusion layer in the first region is smaller than a bonding power between the first catalyst layer and the first gas diffusion layer in the second region.

2. The fuel cell according to claim 1, wherein a bonding power between the electrolyte membrane and the first catalyst layer in the first region is smaller than a bonding power between the electrolyte membrane and the first catalyst layer in the second region.

3. The fuel cell according to claim 1, wherein a bonding power between the second catalyst layer and the second gas diffusion layer in the first region is smaller than the bonding power between the first catalyst layer and the first gas diffusion layer in the second region.

4. The fuel cell according to claim 1, wherein a bonding power between the electrolyte membrane and the second catalyst layer in the first region is smaller than a bonding power between the electrolyte membrane and the first catalyst layer in the second region.

5. The fuel cell according to claim 1, wherein respective outer peripheral edges of the electrolyte membrane, the first catalyst layer, and the first gas diffusion layer overlap each other.

6. The fuel cell according to claim 1, wherein:
the second catalyst layer is smaller than the second gas diffusion layer; and
the second catalyst layer is placed inwardly from an outer periphery of the second gas diffusion layer.

7. The fuel cell according to claim 1, further comprising an adhesive layer placed on the second surface of the electrolyte membrane, wherein:
when the adhesive layer is viewed from the direction perpendicular to the electrolyte membrane, the adhesive layer is placed in the second region and a region where the support frame is present.

8. A manufacturing method for manufacturing a fuel cell including an electrolyte membrane, first and second catalyst layers, first and second gas diffusion layers, and a support frame,
the first catalyst layer being placed on a first surface of the electrolyte membrane,
the first gas diffusion layer being placed on the first catalyst layer,
the second catalyst layer smaller than the electrolyte membrane being placed on a second surface of the electrolyte membrane such that the second catalyst layer is placed inwardly from an outer periphery of the electrolyte membrane,
the second gas diffusion layer smaller than the electrolyte membrane being placed on the second catalyst layer such that the second gas diffusion layer is placed inwardly from the outer periphery of the electrolyte membrane,
the support frame including an opening larger than the second catalyst layer and the second gas diffusion layer and being placed on the second surface of the electrolyte membrane such that the second catalyst layer and the second gas diffusion layer are placed inside the opening,
when the fuel cell is viewed from a direction perpendicular to the electrolyte membrane, a first region and a second region being present, the first region being a region where the second gas diffusion layer is present, the second region being a region between an outer peripheral edge part of the second gas diffusion layer and an inner peripheral edge part of the opening of the support frame,
the manufacturing method comprising:
a step of sequentially placing the first catalyst layer and the first gas diffusion layer on the first surface of the electrolyte membrane;
a first pressure bonding step of bonding, by pressure, the first gas diffusion layer, the first catalyst layer, and the electrolyte membrane in the first region to each other at a first temperature;
a second pressure bonding step of bonding, by pressure, the first gas diffusion layer, the first catalyst layer, and the electrolyte membrane in the second region to each other at a second temperature higher than the first temperature; and
a placing step of, after the first and second pressure bonding steps, placing the second catalyst layer, the second gas diffusion layer, and the support frame on a second surface of the electrolyte membrane.

9. The manufacturing method according to claim 8, wherein a pressure in the first pressure bonding step is lower than a pressure in the second pressure bonding step.

10. The manufacturing method according to claim 8, wherein the first pressure bonding step and the second pressure bonding step are performed at the same time.

11. The manufacturing method according to claim 8, wherein the placing step includes:
a step of placing the second catalyst layer on the second surface of the electrolyte membrane;
a step of placing the second gas diffusion layer on the second catalyst layer; and
a third pressure bonding step of bonding, by pressure, the first gas diffusion layer, the first catalyst layer, the electrolyte membrane, the second catalyst layer, and the second gas diffusion layer in the first region to each other at a third temperature lower than the second temperature.

12. The manufacturing method according to claim 8, wherein the placing step includes:
a step of placing the second catalyst layer on the second surface of the electrolyte membrane;
a step of placing an adhesive layer in a region outside an outer peripheral edge part of the second catalyst layer, on the second surface of the electrolyte membrane;
a step of placing the support frame on the adhesive layer; and
a step of placing the second gas diffusion layer on the second catalyst layer.

* * * * *